T. H. THOMAS.
SAFETY CAR CONTROL EQUIPMENT.
APPLICATION FILED SEPT. 3, 1919.
1,390,594.
Patented Sept. 13, 1921.
2 SHEETS—SHEET 2.
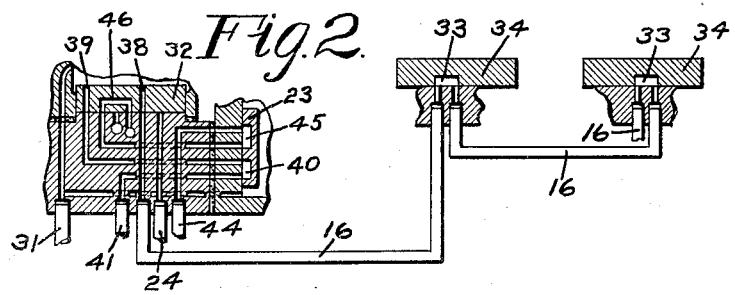
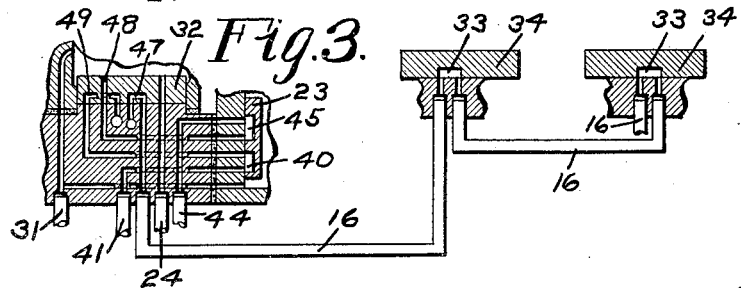
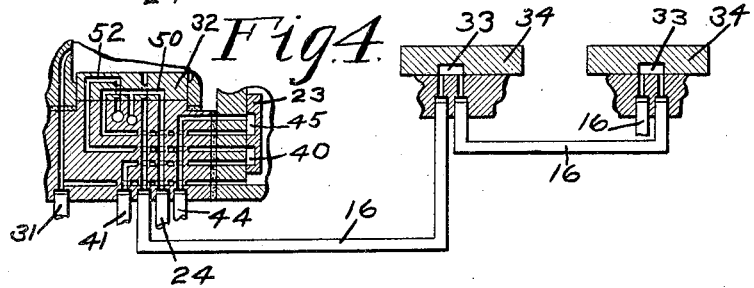
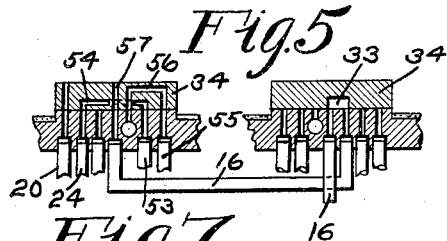
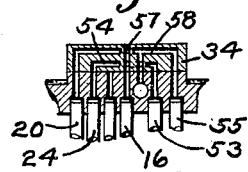
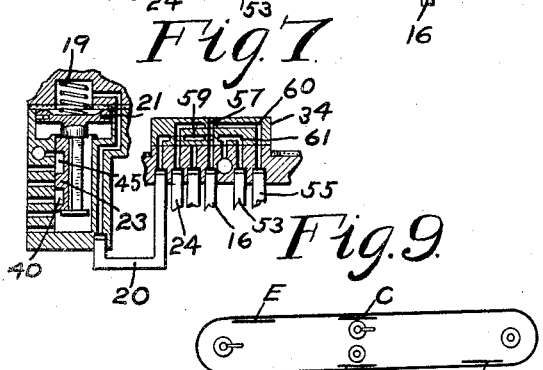
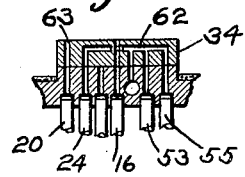
INVENTOR
Thomas H. Thomas
BY Wm. M. Cady
ATTORNEY

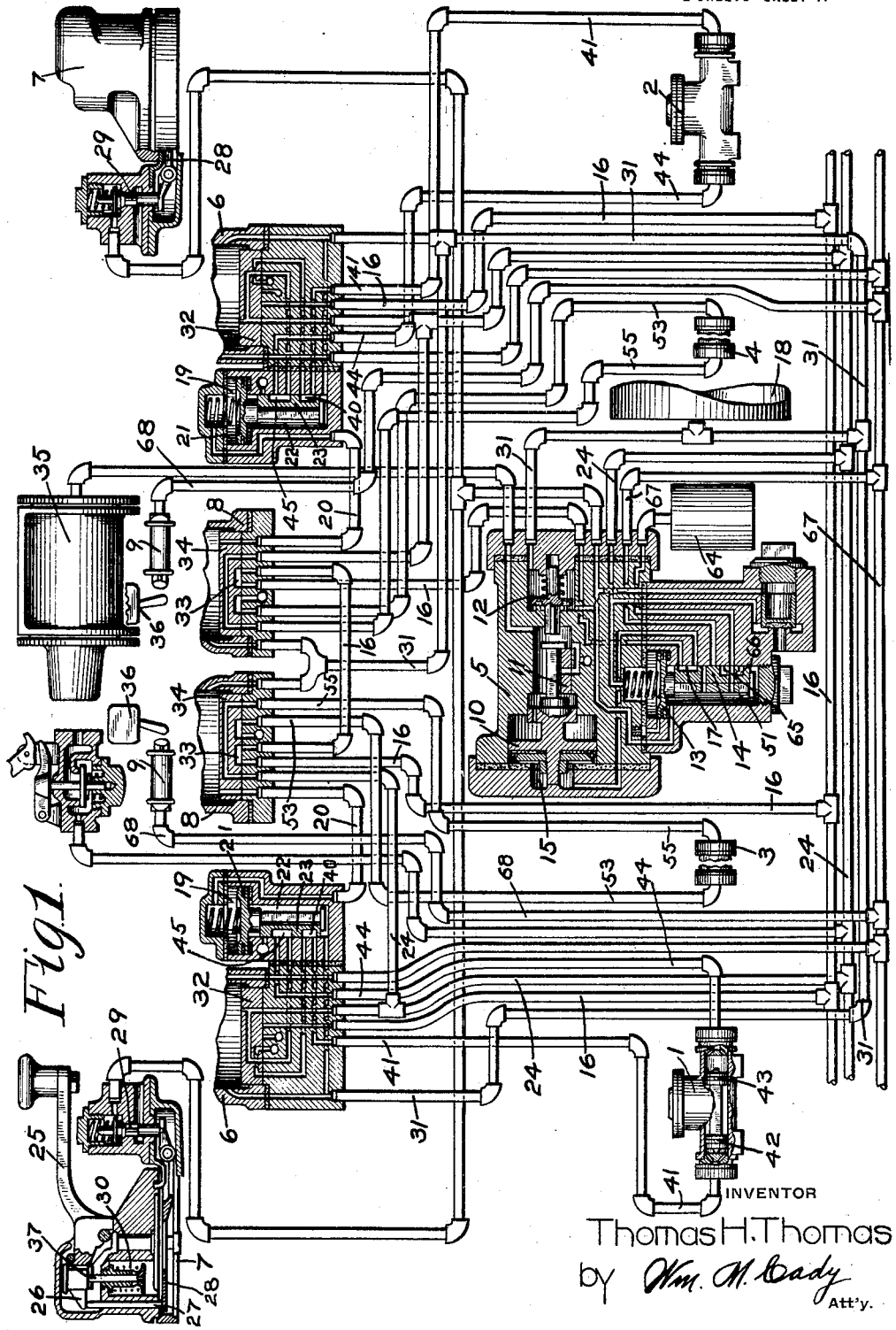

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY CAR-CONTROL EQUIPMENT.

1,390,594.     Specification of Letters Patent.     Patented Sept. 13, 1921.

Application filed September 3, 1919. Serial No. 321,400.

*To all whom it may concern:*

Be it known that I, THOMAS H. THOMAS, a citizen of the United States, residing at Edgewood, in the county of Allegheny and State of Pennsylvania, have invented new and useful Improvements in Safety Car-Control Equipments, of which the following is a specification.

This invention relates to car control apparatus, and more particularly as applied to cars employed in electric traction service.

It has heretofore been proposed to provide what is known as a safety car control equipment, in which a single operator controls the car, including the operation of the brakes, the car doors and steps, the electric power, and the collection of fares.

In some instances, where the traffic is exceptionally heavy and during rush hours, it may be desirable to operate cars of the safety control type in trains of two and possibly more cars.

In such cases, it is necessary to provide a conductor on each of the trailer cars and it may also be desirable to at times provide a conductor on cars operated singly, where the traffic is very heavy.

One object of my invention is to provide a safety car equipment adapted for operation either on a single car or on two or more cars coupled together.

Another object of my invention is to provide an equipment in which the conductor can operate either the center door of the car, the end door, or both together.

Another object of my invention is to provide a safety controller handle which will operate, when the hand is removed from the controller handle, to apply the brakes, but which will not operate to apply the brakes when the handle is removed from the controller.

In the accompanying drawings; Figure 1 is a diagrammatic view of a safety car control equipment embodying my invention; Fig. 2 a diagrammatic view of the motorman's brake valve and the conductor's controlling valves, with the motorman's brake valve in straight air application position; Fig. 3 a view similar to Fig. 2, showing the motorman's brake valve in release position; Fig. 4 a view similar to Fig. 2, showing the motorman's brake valve in emergency application position; Fig. 5 a diagrammatic view of the conductor's controlling valves showing the operating valve in position for opening the center door of the car; Fig. 6 a diagrammatic view of the conductor's controlling valve in position for opening the end door and the center door; Fig. 7 a diagrammatic view of the conductor's controlling valve and the transfer valve, showing the conductor's valve in position for opening the end door only; Fig. 8 a diagrammatic view of the conductor's controlling valve in emergency position; and Fig. 9 a diagrammatic view of a car, showing the arrangement of doors, the motorman's brake valves, and the conductor's controlling valves.

While various features of the invention are not limited in their application thereto, the drawings illustrate an equipment designed for operation on a car having a center door on each side and a door at each end of the car.

For controlling the doors, pneumatically operated door engines 1, 2, 3, and 4 are provided, the door engines 1 and 2 for the respective end doors, and the door engines 3 and 4 for each of the center doors.

The brakes are controlled by a straight air emergency valve device 5 of a type adapted for operation on trains of two or more cars, similar to the straight air emergency valve device covered by Patent No. 1,057,509 of W. V. Turner, dated April 1, 1913.

At each end of the car there is provided a motorman's brake valve 6 and a controller handle device 7 of the safety control type.

For convenient operation by the conductor at the center of the car there is provided on each side, a conductor's door control valve 8, one adapted to control the center door and the end door on one side of the car, and the other the center door and end door on the other side of the car.

There is also provided at each end of the car, a circuit breaker cylinder 9 which is adapted, when supplied with fluid under pressure, to operate a circuit breaker 36 for opening the power circuit of the car.

The straight air emergency valve device 5 comprises an application portion having a piston 10 for operating a release valve 11 and an application valve 12 and an emergency valve portion having a piston 13 for operating a slide valve 14.

Normally, the piston chamber 15 of piston 10 is connected through a cavity 17 in the emergency slide valve 14 with a straight air pipe 16, but upon movement of piston 13 when the pressure in the emergency brake pipe 24 is reduced, the piston chamber 15 is connected to the main reservoir 18.

Associated with each motorman's brake valve 6 is a transfer valve device operated by the conductor's door control valve 8 for controlling one of the end doors of the car and said valve device may comprise a casing having a piston chamber 19 connected by pipe 20 to the conductor's valve 8 and containing piston 21 and having a valve chamber 22, containing a slide valve 23 adapted to be operated by piston 21 for varying the fluid pressure on the door engine for controlling the end door.

The controller handle device 7 comprises a pivoted handle 25 having a projecting finger 26 adapted to engage a movable pin 27. The pin 27 engages a pivoted lever 28 at one end, and at the opposite end the lever engages a pilot valve 29. A spring device 30 acts on the handle 25 through a member 37 and tends to cause the finger 26 to move the pin 27 so as to operate the lever 28 and thereby the pilot valve 29.

In operation, fluid under pressure is supplied from the main reservoir 18 to the main reservoir pipe 31 and thence to the rotary valve chambers of the motorman's and conductor's brake valves 6 and 8.

The emergency brake pipe 24 is charged in the usual way through ports in the motorman's brake valve and the valve chamber 19 is maintained charged through pipe 20 and ports in the conductor's valve device 8.

If the car is operated as a one man car, the motorman controls the car by manipulation of the brake valve 6 at the operating end of the car.

The conductor's valve devices 8 are normally in handle off position, as shown in the drawings, and if the motorman desires to make a straight air application of the brakes, he turns the brake valve handle to straight air application position, in which fluid under pressure is supplied through a port 38 in the rotary valve 32 to the straight air pipe 16, as shown in Fig. 2 of the drawings. In the handle off position of the conductor's valve devices 8, a cavity 33 in the rotary valve 34 of each valve device establishes communication through the straight air pipe 16, as will be clear from the drawings, so that fluid can flow through said pipe, and through cavity 17 in the emergency slide valve 14 to piston chamber 15.

The piston 10 thereupon operates to close the exhaust valve 11 and open the application valve 12, so that fluid under pressure is supplied from the main reservoir 18 to the brake cylinder 35.

Assuming that the operating valve 6 is the one at the left of Fig. 1, when the rotary valve 32 is in straight air application position, the end door adjacent to the operator is opened, since fluid under pressure is supplied through port 39, cavity 40 of the transfer slide valve 23 and pipe 41 to the piston 42 of the door engine 1, while fluid is vented from piston 43 through pipe 44, cavity 45 in the transfer slide valve 23 and cavity 46 in rotary valve 32 to the atmosphere. The door engine pistons are thereupon shifted to the door opening position for opening the end door of the car.

The brakes may be released and the door closed by moving the motorman's brake valve to release position, as shown in Fig. 3 of the drawings, in which the straight air pipe is connected through cavity 47 with the atmosphere, and in which the door closing pipe 44 is supplied with fluid under pressure through port 48 in the rotary valve 32, while the door opening pipe 41 is vented to the atmosphere through cavity 49 in the rotary valve 32, so that the car door is moved to the closed position by the door engine 1.

An emergency application of the brakes may be effected by moving the motorman's brake valve to emergency position, as shown in Fig. 4 of the drawings, in which the emergency brake pipe is vented to the atmosphere through cavity 50 in the rotary valve 32. The reduction thus produced in emergency brake pipe pressure causes the emergency piston 13 of the emergency valve device 5 to be shifted to emergency position, in which fluid under pressure is supplied from valve chamber 51 to piston chamber 15, so as to operate piston 10 to supply fluid to the brake cylinder 35.

In the emergency position of the rotary valve 32, the door closing pipe 44 is connected to the exhaust through cavity 50 in the rotary valve 32 and the door opening pipe 41 is also connected to the exhaust through cavity 52, so that the fluid pressures on the pistons 42 and 43 of the door engine 1 being balanced, the door may be freely opened by a passenger within the car.

If there is a conductor on the car and he wishes to open the center door of the car, he turns the operating conductor's controlling valve to the position shown in Fig. 5 of the drawings, in which the door opening pipe 53 of the door engine 3, assuming that the conductor's valve 8 at the left is being operated, is connected through cavity 54 to brake pipe 24, while the door closing pipe 55 is connected to the exhaust through cavity 56, so that the door engine 3 is operated to open the center door of the car on the operating side.

In this position, a port 57 in the valve 34 supplies fluid under pressure to the straight air pipe 16, so that the brakes are applied whenever the conductor opens the center door.

If the conductor wishes to open both the end door and the center door on the operating side of the car, he turns the conductor's controlling valve to the position shown in Fig. 6 of the drawings, in which the center door closing pipe 55 is connected to the atmosphere through cavity 58, while the door opening pipe 53 is connected through cavity 54 with the brake pipe 24, thus operating the door engine 3 to open the center door. In this position, the pipe 20 is also connected to the exhaust through cavity 58, so that fluid is vented from the piston chamber 19 of the transfer valve device and thereupon the piston 21 operates the slide valve 23 to cut off communication from the motorman's brake valve 6 to the door engine 1, while the door closing pipe 44 of said engine is connected by cavity 45 in the slide valve 23 to the atmosphere, and the door opening pipe 41 is supplied with fluid under pressure from valve chamber 22.

It will therefore be seen that both the center and the end doors are opened by moving the conductor's controlling valve to this position.

If the conductor desires to open the end door only, he turns the conductor's controlling valve to the position shown in Fig. 7 of the drawings, in which pipe 20 is connected through cavity 59 with the atmosphere, so that the transfer valve 23 is operated to effect the opening if the end car door is in the previously described position.

In both of the last described positions, the port 57 supplies fluid under pressure to the straight air pipe 16, so that the brakes are applied when the car doors are opened.

In the position for opening the end door only, the door closing pipe 55 is connected through cavity 60 with brake pipe 24, while the door opening pipe 53 is connected through cavity 61 with the exhaust, so that the center door will be held closed.

The conductor may effect an emergency application of the brakes by turning the conductor's controlling valve to the position shown in Fig. 8 of the drawings, in which the emergency brake pipe 24 is connected through cavity 62 with the exhaust to effect a reduction in brake pipe pressure and a corresponding emergency application of the brakes while both the door opening pipe 53 and the door closing pipe 55 are connected to the exhaust through the same cavity 62, so that the fluid pressures are balanced on the center door operating engine, thus permitting this door to be opened by a passenger within the car.

Fluid under pressure is supplied in this position through port 63 to pipe 20, so that the transfer valve 23 is maintained in its normal position with the end door of the car held in closed position.

In the release position of the emergency slide valve 14, a sanding reservoir 64 is charged with fluid under pressure from valve chamber 51, through port 65 and when this valve is moved to emergency application position, the charged reservoir 64 is connected through cavity 66 with a pipe 67.

Fluid supplied to pipe 67 then operates to cause sand to be applied to the rails.

As it is desirable that the power be cut off whenever an emergency application of the brakes is made, one feature of my invention consists in connecting the sand pipe 67 by a pipe 68 to the circuit breaker cylinder 9, so that since fluid is supplied to the sand pipe 67 in an emergency application of the brakes, fluid will also be admitted through pipe 68 to the cylinder 9 so as to operate the circuit breaker 36 to open the electric power circuit of the car.

By employing a pin 27 for operating the lever 28 of the safety controller handle device 7 which is independent of the spring 30, it will be seen that while the spring acts through the handle 25 to depress the pin 27 when the handle is in its operating position, upon removing the handle, the spring can no longer act on the pin 27, so that the brakes will not be applied by operation of the pilot valve 29 when the controller handle is removed from the controller.

In Fig. 9 is shown the diagram of a car, illustrating the particular arrangement of the car doors and the motorman's and conductor's controlling valves herein described.

If the car be running in the direction of the arrow, the motorman's brake valve at the forward end will be the operating valve, while the conductor's controlling valve at the right will be the conductor's operating valve.

The door E is controlled by the motorman's brake valve at the forward end of the car, while the doors E and C may be controlled by the conductor's controlling valve at the right side of the car, the other controlling valves being employed for controlling the car doors C' and E' in a similar manner.

Having now described my invention, what I claim as new, and desire to secure by Letters Patent, is:—

1. The combination with a motorman's brake valve device for controlling a car door, of a conductor's controlling valve device and means controlled by said conductor's valve device for also controlling said car door.

2. The combination with a motorman's brake valve device having ports for controlling an end car door, of a conductor's controlling valve device having ports for controlling a center car door and means controlled by the conductor's valve device for controlling said end door.

3. The combination with a door engine operated by fluid under pressure for controlling a car door and a motorman's brake valve device having ports for varying the fluid pressure on said door engine, of a transfer valve device operated by variations in fluid under pressure for also controlling the fluid pressure on said door engine and a conductor's controlling valve device for varying the fluid pressure on said transfer valve device.

4. The combination with a door engine operated by increasing and decreasing the fluid pressure thereon for controlling an end car door and a door engine operated by increasing and decreasing the fluid pressure for controlling a center car door, of a conductor's controlling valve device having one position for varying the fluid pressure on the door engine controlling the center car door, another position for varying the fluid pressure on the door engine controlling the end car door, and a third position for varying the fluid pressures on both door engines.

5. The combination with a door engine operated by variations in fluid pressure for controlling a car door and a motorman's brake valve device having ports for varying the fluid pressure on said door engine, of a transfer valve device for controlling communication through which the motorman's brake valve varies the fluid pressure on said door engine and a conductor's controlling valve device for operating said transfer valve device to cut off said communication.

6. The combination with a door engine operated by variations in fluid pressure for controlling a car door and a motorman's brake valve device having ports for varying the fluid pressure on said door engine, of a transfer valve device normally establishing communication through which the motorman's brake valve device varies the fluid pressure on said door engine and a conductor's controlling valve device for operating said transfer valve device to cut off said communication and vary the fluid pressure on said door engine to operate same for opening the car door.

7. The combination with a pipe for supplying fluid under pressure to effect the sanding of the rails, a brake pipe, and a valve device operated upon a reduction in brake pipe pressure for effecting an emergency application of the brakes and adapted in emergency position to supply fluid under pressure to said sanding pipe, of means operated by fluid supplied to said sanding pipe for opening the power circuit of the car.

8. The combination with a pipe for supplying fluid under pressure to effect the sanding of the rails, a reservoir normally charged with fluid under pressure, a brake pipe, and an emergency valve device operated upon a reduction in brake pipe pressure for effecting an emergency application of the brakes and for supplying fluid from said reservoir to said sanding pipe, of means operated by fluid supplied to said sanding pipe for opening the power circuit of the car.

In testimony whereof I have hereunto set my hand.

THOMAS H. THOMAS.